May 15, 1923.
H. MAIMIN
MOUNTING FOR SEWING MACHINE MOTORS
Original Filed Jan. 8, 1920
1,455,345
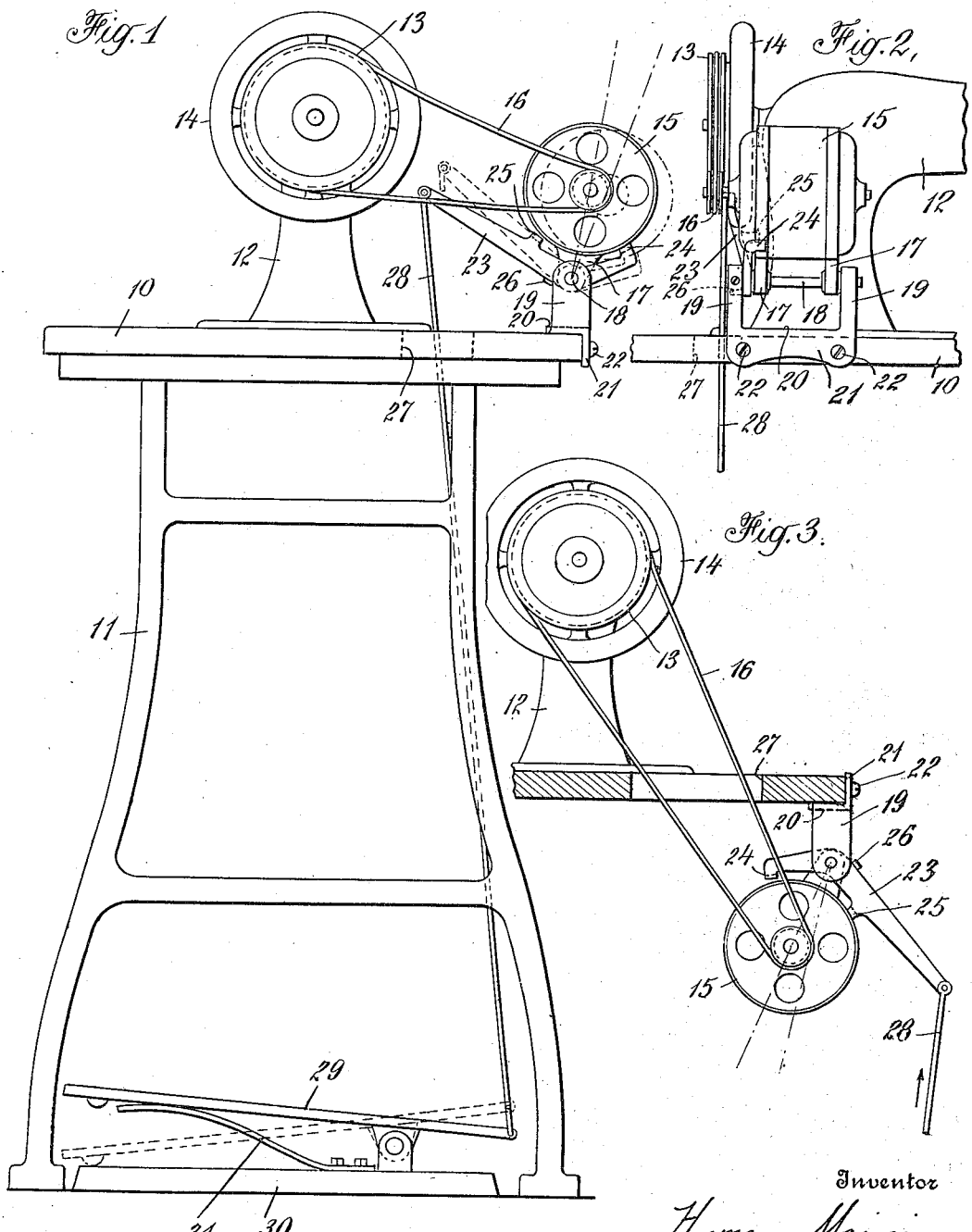

Patented May 15, 1923.

1,455,345

UNITED STATES PATENT OFFICE.

HYMAN MAIMIN, OF NEW YORK, N. Y.

MOUNTING FOR SEWING-MACHINE MOTORS.

Application filed January 8, 1920, Serial No. 350,243. Renewed October 6, 1922. Serial No. 592,845.

*To all whom it may concern:*

Be it known that I, HYMAN MAIMIN, a citizen of the United States, residing at New York city, in the county of New York, State of New York, have invented certain new and useful Improvements in Mountings for Sewing-Machine Motors; and I do hereby declare the following to be a full, clear, and exact description of the invention, such as will enable others skilled in the art to which it appertains to make and use the same.

This invention relates to a mounting for sewing machine motors.

Sewing machines, particularly those that are to be run continuously, as in the garment industries, are usually driven by small electric motors mounted in permanent operative relation to the machines and provided with rheostats for preventing sudden rushes of current when the motors are started under load, and also to permit the speeds of the machines to be controlled while in operation. It has been proposed to eliminate the use of rheostats in conjunction with sewing machine motors by allowing the motors to run continuously, and pivotally mounting them adjacent the hand wheels or driving pulleys of the sewing machines in such a manner that they may be thrown into or withdrawn from operative relation to the machines by swinging them about their pivots. This arrangement provides that the speeds at which the machines shall be driven by the motors will under normal conditions be of predetermined maximum amounts and will not be as subject to variations in the efforts expended by the operators as are prior arrangements of this general character. This arrangement does, however, permit the operator to change the speed of the machine from time to time as may be required, but this alteration necessitates a special act on his part which will not naturally be performed under normal conditions of operation. Power may be transmitted from the motors to the machines by means of belt connections between pulleys on the shafts of the motors and pulleys on the shafts of the machines, in which case the motors are arranged to fall away from the machines to apply tension to the belts. For most convenient operation the positions of the motors are controlled by treadles in order that the hands of the operators may be free for manipulating their work. In the particular embodiments of the invention shown in my copending application mentioned above, the treadles are connected directly to the motors by means of flexible members and are actuated by springs in such a manner as normally to swing the motors so that their driving belts will be slackened. When the effect of the springs is overcome by pressure upon the treadles the motors will fall into position to transmit power to the machines, and the arrangements are such that the normal movement imparted to the treadles will be sufficient to slacken the flexible connections so that the motors will be held in operative relation to the wheels of the machines by their own weight independently of any effect of the treadle springs.

Where the supporting brackets cannot conveniently be attached to the frames of sewing machines, it has been proposed to mount such motors upon the table of the machine, and the lost motion connection between the motor and the treadle is obtained by means of a lever mounted to swing about an axis preferably coinciding with the pivotal axis of the motor and one end of which is adapted to be brought into engagement with the motor to move the latter when the lever is swung in one direction by means of a connection between the other end of the lever and the treadle of the machine, the relation of the parts being such that when the treadle is completely depressed the lever will exert no lifting effect upon the motor so that the latter will be held in operative relation to the machine by its weight independently of any effect of the treadle spring.

In all of such cases, however, it has been customary to mount the motors above the tables, either by being carried upon brackets attached to the frames of the machines, or by being mounted upon pedestals adapted to be attached to the tables of the machines. It has been found in practice that it is somewhat disconcerting to certain operators to have the motor placed above the table, particularly in those cases where the operators have been accustomed to work with machines in which the motors were not normally in sight. The presence of the motors and their supports upon the tables is also objectionable in many cases as they constitute obstructions and interfere with the use of the tables for holding the work, particularly if the latter be voluminous.

It is accordingly an object of the present invention to provide a support for sewing machine motors adapted to be attached to the table of the sewing machine to position the motor either above or below the table as may be desired, and upon which the motor is so mounted that in either position of the support the motor may be held in operative relation to the machine by its own weight. For the purpose of controlling the position of the motor there is associated with the support a lever which is connected to a spring-actuated treadle by means of a rigid member so that the use of flexible connections which tend to stretch during usage is avoided. In accordance with the present invention the lever is so constructed that it is adapted for use in either position of the support, and a portion of the lever, which is adapted to engage the motor to move the latter, when the support is in one position, also acts as a stop to limit the movement of the motor when the support is in the other position.

The particular nature of the invention, as well as other objects and advantages thereof, will appear more clearly from a description of certain preferred embodiments as illustrated in the accompanying drawings, in which—

Fig. 1 is an end elevation of a sewing machine with the support and motor positioned above the table of the machine;

Fig. 2 is a side elevation of the apparatus of Fig. 1; and

Fig. 3 shows the support and motor arranged below the table of the machine.

The sewing machine illustrated somewhat diagrammatically in the drawings comprises a table 10 carried upon standards 11 and serving as a support for the frame 12 which consists of a vertical portion and a horizontal portion carrying at its outer end the usual casing within which the mechanism for reciprocating the needle is mounted, this mechanism being driven by a shaft carrying a belt pulley 13 and a hand wheel 14. An electric motor 15 is provided for driving the machine by means of a belt 16 passing over pulley 13.

The motor 15 is provided with lugs 17 adapted to receive a pin 18 extending between the standards of a pedestal 19 having a flat base 20 adapted to engage the top or the bottom of the table of the machine, and a flange 21 adapted to engage the edge of the table and be attached thereto by means of screws 22 passing through the flange.

For the purpose of controlling the position of the motor there is provided a lever 23 preferably mounted upon the pin 18 between one of the standards 19 and the adjacent motor lug 17. The arms of the lever lie at an angle to each other and one of them is provided at its free end with an extension 24 adapted to engage the motor on one side of its pivot. The other arm of the lever is provided with an extension 25 adapted to engage the motor on the other side of its pivot, and a lug 26 adapted to engage the adjacent standard 19 to limit the movement of the lever. This same arm of the lever terminates above one of the usual belt holes 27 in the table of the machine. A rod 28 passing through the belt hole is attached at one end to the lever and at the other end to a treadle 29 mounted upon a base 30 which may be placed in convenient position to be reached by the operator's foot. Beneath the treadle is a spring 31 which normally raises the treadle into the position shown in Fig. 1.

When the apparatus is arranged as shown in Fig. 1, that is, with the motor pedestal attached to the top of the table, the relation between the parts should be such that when the treadle is depressed to its maximum extent as indicated in broken lines in Fig. 1, the motor 15 will fall into the correspondingly indicated position and tighten the belt 16 sufficiently to permit power to be transmitted from the motor to the machine. After the motor has swung away from the machine as far as it will be permitted to do by the belt, a slight additional movement should preferably be imparted to the lever 23 so that its extension 24 may be taken out of engagement with the motor and leave the latter free so that the belt tension produced by the weight of the motor will not be lessened by any opposing effect of the treadle spring 31.

The motor will thus drive the machine at the predetermined speed regarded as suitable for most efficient operation. In case it is desired to lessen the speed of the machine the treadle 29 will be lifted sufficiently to bring the extension 24 of the lever 23 into engagement with the motor and thereafter lift the motor slightly to partially overcome the effect of its weight upon the tension of the driving belt. As a result of the lessened belt tension there will be produced between the belt and the pulleys to which it is connected a certain amount of slip which will cause a decreased speed of the machine without requiring that the speed of the motor be changed by means of a rheostat or similar device.

Since the motor is mounted to swing about a pivot lying below its center of gravity, a sudden release of the treadle might cause a jerk upon the connecting rod 28 and lever 23 which would throw the motor over to the other side of its pivot, in which case it would be in such a position that a subsequent depression of the treadle would not allow the motor to assume its operative position with respect to the driving belt. It is, therefore, desirable to provide an arrangement for limiting the movement of the motor when it is lifted out of operative relation to the belt. In accordance with this invention, the projection 25 and lug 26 are employed for this purpose, these parts being so arranged that the lug 26 will engage the corresponding standard of the pedestal to limit the movement of the lever and bring the extension 25 into position to check the movement of the motor toward the machine in case there should be a tendency for it to be thrown over its pivot.

In case it is desired to remove the motor from the top of the table, the pedestal upon which it is carried is inverted and placed underneath the table as shown in Fig. 3. With this arrangement of the apparatus the motor swings about a pivot above its center of gravity and must be lifted toward the machine to slacken the driving belt. The lever 23 is connected to the treadle in the same manner as in the arrangement shown in Fig. 1, but when the lever is drawn down by the effect of the spring acting upon the treadle, the extension 25 is brought into engagement with the motor to lift the latter sufficiently to slacken the driving belt and prevent power from being transmitted to the machine. When the treadle is depressed, the motor will fall away from the machine to tighten the driving belt, and the lever 23 should preferably be swung far enough to take the projection 25 out of engagement with the motor so that the tension of the driving belt will be produced by the weight of the machine unaffected by the opposing effect of the treadle spring. As long as the treadle is held in completely depressed condition the motor will drive the machine at the predetermined maximum speed. By partly releasing the treadle, however, its spring may be permitted to exert some effect in overcoming the weight of the motor by lifting the latter by means of the lever 23 so that slip may occur between the pulleys and the belt with resultant decrease in the speed of the machine.

The invention thus provides an arrangement for supporting a motor in such a manner that it may be held in operative relation to a sewing machine by its own weight, either above or below the table as may be desired. The arrangement for producing a lost-motion connection between the motor and the actuating treadle is also constructed so that it is adapted for use in either position of the motor, and it possesses the further advantage that the portion through which movement is imparted to the motor when the latter is mounted beneath the table also performs the function of a stop to limit the movement of the motor when it is mounted on top of the table and might be thrown over its pivot by a sudden release of the treadle. The construction of the mechanism for controlling the position of the motor is therefore simplified, and the same member may be used for either position of the motor. The actuating lever may be of such length that when the apparatus is mounted on the top of the table, the connection leading to the treadle may pass through one of the usual belt holes in the table of the machine, while when the device is located beneath the table it is only necessary to lengthen one of the usual belt holes to permit the driving belt to pass through the table of the machine as indicated in Fig. 3.

While certain preferred embodiments of the invention have been shown and described, it will be understood that various changes in the details of construction may be made without departing from the principle of the invention as defined in the appended claims.

I claim:—

1. In a sewing machine mounted upon a table and provided with a driving wheel, the combination of a support adapted to be selectively attached to either face of the table, a motor mounted to swing about an axis on the support and be held in operative relation to the wheel of the machine by its own weight in either position of the support, and means mounted on the support and adapted to be brought into engagement with the motor in either position thereof to lift it out of operative relation to the wheel of the machine.

2. In a sewing machine mounted upon a table and provided with a driving wheel, the combination of a support adapted to be selectively attached to either face of the table, a motor mounted to swing about an axis on the support and be held in operative relation to the wheel of the machine by its own weight in either position of the support, a lever mounted on the support and having one arm adapted to engage the motor when it is in one position and a second arm adapted to engage the motor when it is in the other position, and means for actuating the lever to bring either one or the other of the arms into engagement with the motor according to the position of the motor to lift the motor out of operative relation to the wheel of the machine.

3. In a sewing machine mounted upon a table and provided with a driving wheel, the combination of a pedestal adapted to be selectively attached to either face of the table, a motor mounted to swing about an axis on the pedestal and be held in operative relation to the wheel of the machine by its own weight in either position of the pedestal, and means for lifting the motor out of operative relation to the wheel of the machine and having a lost-motion connection with the motor to permit the latter to assume its operative relation to the wheel of the machine unaffected by the lifting means.

4. In a sewing machine mounted upon a table and provided with a driving wheel, the combination of a pedestal adapted to be selectively attached to either face of the table, a motor mounted to swing about a horizontal axis on the pedestal and be held in operative relation to the wheel of the machine by its own weight in either position of the pedestal, a lever mounted on the pedestal and having one arm provided with an extension adapted to engage the motor on one side of its pivot and a second arm having an extension adapted to engage the motor on the other side of its pivot, and means for actuating the lever to bring one or the other of the extensions into engagement with the motor according to the position of the latter to lift the motor out of operative relation to the wheel of the machine.

5. In a sewing machine mounted upon a table and provided with a driving wheel, the combination of a support adapted to be selectively attached to either face of the table, a motor pivotally mounted upon the support and adapted to be held in operative relation to the wheel of the machine by its own weight in either position of the support, a lever mounted to swing about a pivot coinciding with the pivot of the motor and formed at one end to engage the motor on one side of its pivot and at the other end to engage the motor on the other side of its pivot, and means for actuating the lever to bring one or the other of its ends into engagement with the motor according to the position of the latter to lift the same out of operative relation to the wheel of the machine.

6. In a sewing machine mounted upon a table and provided with a driving wheel, the combination of a support adapted to be selectively attached to either face of the table, a motor pivotally mounted upon the support and adapted to be held in operative relation to the wheel of the machine by its own weight in either position of the support, a lever mounted adjacent the motor and having one arm adapted to be brought into engagement with the motor when the latter is placed above the table, and a second arm adapted to be brought into engagement with the motor when the latter is placed below the table, a swinging member, a connection between the lever and the swinging member, and means for actuating the swinging member to swing the lever in a direction to bring one or the other arm into engagement with the motor according to the position of the motor to move the motor out of operative relation to the driving wheel and adapted to be overcome by the operator to permit the motor to be held in operative relation to the driving wheel of the machine by its own weight in either position of the motor independently of the effect of the actuating means.

7. In a sewing machine mounted upon a table and provided with a driving wheel, the combination of a support adapted to be attached to the table, a motor mounted to swing about an axis on the support and be held in operative relation to the wheel of the machine by its own weight, a lever mounted on the support and formed at one end to engage the motor, means for actuating the lever to bring its end into engagement with the motor to lift the same out of operative relation to the wheel of the machine, and means associated with the lever and adapted to be engaged by the motor for limiting its movement after it has been lifted.

8. In a sewing machine provided with a driving wheel, a motor mounted to swing about a pivot lying below its center of gravity, and driving connections between the wheel and the motor, the combination of means for controlling the position of the motor, comprising a lever mounted adjacent to the motor and formed at one end to engage the motor, a spring-pressed treadle and a connection between the treadle and the lever by means of which a pull may be exerted upon the lever to bring its end into engagement with the motor to lift the same out of operative relation to the wheel of the machine, and means associated with the lever for engaging the motor and preventing it from being thrown to the other side of its pivot when it is lifted by the spring-pressed treadle.

9. In a sewing machine provided with a driving wheel and a pivotally mounted motor adapted to be held in operative relation to the wheel by its own weight, the combination of means for controlling the position of the motor comprising a lever pivotally mounted adjacent to the motor and having one arm provided with a member adapted to engage the motor, means for actuating the lever to bring the member into engagement with the motor to lift the same out of operative relation to the wheel of the machine, and means associated with the other arm of the lever and constituting a stop for limiting the movement of the motor after it has been lifted.

10. In a sewing machine mounted upon a table and provided with a driving wheel, the combination of a support adapted to be selectively positioned upon the faces of the table, a belt associated with the driving wheel of the machine, a motor connected to the belt and pivotally mounted upon the support in such a manner that the weight of the motor places the belt under tension in either position of the support, a lever mounted adjacent to the motor and adapted to engage the motor on each side of its pivot, and means for actuating the lever to bring it into engagement with the motor to lift the same out of operative relation to the wheel of the machine in either position of the motor, said means being adapted to be overcome by the operator to release the lever so that the motor may tighten the belt and be held in operative relation thereto by its own weight unaffected by said means.

In testimony whereof I affix my signature.

HYMAN MAIMIN.